US011348354B2

(12) United States Patent
Wang et al.

(10) Patent No.: US 11,348,354 B2
(45) Date of Patent: May 31, 2022

(54) HUMAN BODY TRACING METHOD, APPARATUS AND DEVICE, AND STORAGE MEDIUM

(71) Applicant: BAIDU ONLINE NETWORK TECHNOLOGY (BEIJING) CO., LTD., Beijing (CN)

(72) Inventors: Zhigang Wang, Beijing (CN); Jian Wang, Beijing (CN); Xubin Li, Beijing (CN); Le Kang, Sunnyvale, CA (US); Zeyu Liu, Beijing (CN); Xiao Liu, Beijing (CN); Hao Sun, Beijing (CN); Shilei Wen, Beijing (CN); Yingze Bao, Sunnyvale, CA (US); Mingyu Chen, Beijing (CN); Errui Ding, Beijing (CN)

(73) Assignee: BAIDU ONLINE NETWORK TECHNOLOGY (BEIJING) CO., LTD.

(*) Notice: Subject to any disclaimer, the term of this patent is extended or adjusted under 35 U.S.C. 154(b) by 395 days.

(21) Appl. No.: 16/458,531

(22) Filed: Jul. 1, 2019

(65) Prior Publication Data
US 2019/0325208 A1 Oct. 24, 2019

(30) Foreign Application Priority Data

Jul. 2, 2018 (CN) .......................... 201810710538.X

(51) Int. Cl.
*G06V 40/10* (2022.01)
*G06T 7/292* (2017.01)
(Continued)

(52) U.S. Cl.
CPC ............ *G06V 40/103* (2022.01); *G06T 7/246* (2017.01); *G06T 7/292* (2017.01); *G06V 10/95* (2022.01);
(Continued)

(58) Field of Classification Search
None
See application file for complete search history.

(56) References Cited

U.S. PATENT DOCUMENTS

2014/0341427 A1* 11/2014 Kawano ............ G06K 9/00771
382/103

FOREIGN PATENT DOCUMENTS

CN 101162525 A 4/2008
CN 101854516 A 10/2010
(Continued)

OTHER PUBLICATIONS

First Office Acton Issued in Parallel Japanese Patent Application No. 2019-122659, dated Sep. 1, 2020, 6 pages.
(Continued)

*Primary Examiner* — Delomia L Gilliard
(74) *Attorney, Agent, or Firm* — Dilworth IP, LLC

(57) ABSTRACT

A human body tracking method, apparatus, and device, and a storage medium. The method includes: obtaining a current frame image captured by a target photographing device at a current moment; detecting each human body in the current frame image to obtain first position information of the each human body in the current frame image; calculating second position information of a first human body in the current frame image; determining target position information of the each human body in the current frame image according to the second position information of the first human body in the current frame image, the first position information of the each human body in the current frame image, and pedestrian features of all tracked pedestrians stored in a preset list.

16 Claims, 5 Drawing Sheets

(51) Int. Cl.
    *G06T 7/246*     (2017.01)
    *G06V 10/94*     (2022.01)
    *G06K 9/62*     (2022.01)
    *G06T 17/00*     (2006.01)
    *G06V 20/52*     (2022.01)
    *G06V 40/20*     (2022.01)

(52) U.S. Cl.
    CPC ............ *G06K 9/6262* (2013.01); *G06T 17/00* (2013.01); *G06T 2207/10016* (2013.01); *G06T 2207/30196* (2013.01); *G06V 20/52* (2022.01); *G06V 40/20* (2022.01)

(56) References Cited

FOREIGN PATENT DOCUMENTS

| | | |
|---|---|---|
| CN | 102129690 A | 7/2011 |
| CN | 102509306 A | 6/2012 |
| CN | 102982598 A | 3/2013 |
| CN | 104050712 A | 9/2014 |
| CN | 104281837 A | 1/2015 |
| CN | 105933650 A | 9/2016 |
| CN | 106355603 A | 1/2017 |
| CN | 107341460 A | 11/2017 |
| JP | 2004146647 A | 5/2004 |
| JP | 2008217714 A | 9/2008 |
| JP | 2010238187 A | 10/2010 |
| JP | 2014241578 A | 12/2014 |
| JP | 2017016356 A | 1/2017 |
| JP | 2017163286 A | 9/2017 |
| JP | 2018032078 A | 3/2018 |

OTHER PUBLICATIONS

Shahraki et al., "A Trajectory Based Method of Automatic Counting of Cyclist in Traffic Video Data", International Journal of Artificial Intelligence Tools, vol. 26, No. 4 (2017). pp. 1750015-1-1750015-20.
Xu et al., "Real-Time Human Objects Tracking for Smart Surveillance at the Edge", © 2018 IEEE. pp. 1-6.
Extended European Search Report, Application No. 19182982.9, dated Nov. 7, 2019, 11 pages.
Notice of Allowance in JP Patent Application No. 2019122659 dated Mar. 23, 2021.
First Office Action in CN Patent Application No. 201810710538.X dated Oct. 29, 2021.

* cited by examiner

HUMAN BODY TRACING METHOD, APPARATUS AND DEVICE, AND STORAGE MEDIUM

CROSS-REFERENCE TO RELATED APPLICATION

This application claims priority to Chinese Patent Application No. 201810710538.X, filed on Jul. 2, 2018, which is hereby incorporated by reference in its entirety.

FIELD

Embodiments of the present disclosure relate to the field of communication technologies, and in particular, to a human body tracking method, apparatus and device, and a storage medium.

BACKGROUND

In the prior art, a video or an image captured by a photographing device may include a human body, and sometimes it is necessary to track a human body in different images.

However, the position of the human body in the space may change in real time, resulting in a change in the position of the same human body in different images, thus a poor accuracy of tracking the human body in the images.

SUMMARY

Embodiments of the present disclosure provide a human body tracking method, apparatus and device, and a storage medium to improve the accuracy of human body tracking in images.

In a first aspect, an embodiment of the present disclosure provides a human body tracking method, including:

obtaining a current frame image captured by a target photographing device at a current moment;

detecting each human body in the current frame image to obtain first position information of the each human body in the current frame image;

calculating, by using a preset tracking algorithm, second position information of a first human body in the current frame image, wherein the first human body is tracked in a previous frame image ahead of the current frame image;

determining target position information of the each human body in the current frame image according to the second position information of the first human body in the current frame image, the first position information of the each human body in the current frame image, and pedestrian features of all tracked pedestrians stored in a preset list;

where the pedestrian features of all the tracked pedestrians stored in the preset list are determined according to historical images captured by a plurality of photographing devices.

In a second aspect, an embodiment of the present disclosure provides a human body tracking apparatus, including:

an obtaining module, configured to obtain a current frame image captured by a target photographing device at a current moment;

a detecting module, configured to detect each human body in the current frame image to obtain first position information of the each human body in the current frame image;

a calculating module, configured to calculate, by using a preset tracking algorithm, second position information of a first human body in the current frame image, wherein the first human body is tracked in a previous frame image ahead of the current frame image;

a determining module, configured to determine target position information of the each human body in the current frame image according to the second position information of the first human body in the current frame image, the first position information of the each human body in the current frame image, and pedestrian features of all tracked pedestrians stored in a preset list;

where the pedestrian features of all the tracked pedestrians stored in the preset list are determined according to historical images captured by a plurality of photographing devices.

In a third aspect, an embodiment of the present disclosure provides an image processing device, including:

a memory;

a processor; and a computer program;

where the computer program is stored in the memory and configured to be executed by the processor to implement the method of the first aspect.

In a fourth aspect, an embodiment of the present disclosure provides a computer readable storage medium having a computer program stored thereon, and the computer program is executed by a processor to implement the method of the first aspect.

The human body tracking method, apparatus, and device, and a storage medium provided by the embodiments of the present disclosure obtain first position information of each human body in a current frame image by detecting the each human body in the current frame image, calculate second position information of a first human body in the current frame image tracked in a previous frame image ahead of the current frame image by using a preset tracking algorithm, determine target position information of the each human body in the current frame image according to the second position information of the first human body in the current frame image, the first position information of the each human body in the current frame image, and pedestrian features of all the tracked pedestrians stored in a preset list, where pedestrian features of all the tracked pedestrians stored in the preset list are determined according to historical images captured by a plurality of photographing devices, and the target position information is the more accurate one of the first position information and the second position information, thereby improving the accuracy of human body tracking in images.

The embodiments of the present disclosure have been shown explicitly by the drawings described above, and will be described in more detail below. These drawings and descriptions are not intended to limit the scope of the ideas of the present disclosure, or rather to illustrate the concept of the present disclosure for those skilled in the art by reference to the specific embodiments.

DETAILED DESCRIPTION

Exemplary embodiments will be described in detail herein, and examples thereof are illustrated in appended drawings. When the following description relates to the drawings, unless otherwise indicated, the same number in different drawings represents the same or similar elements. Implementations described in following exemplary embodiments do not represent all embodiments consistent with the present disclosure. Instead, they are merely examples of apparatuses and methods consistent with some aspects of the present disclosure as described in detail in the appended claims.

Figure 1:
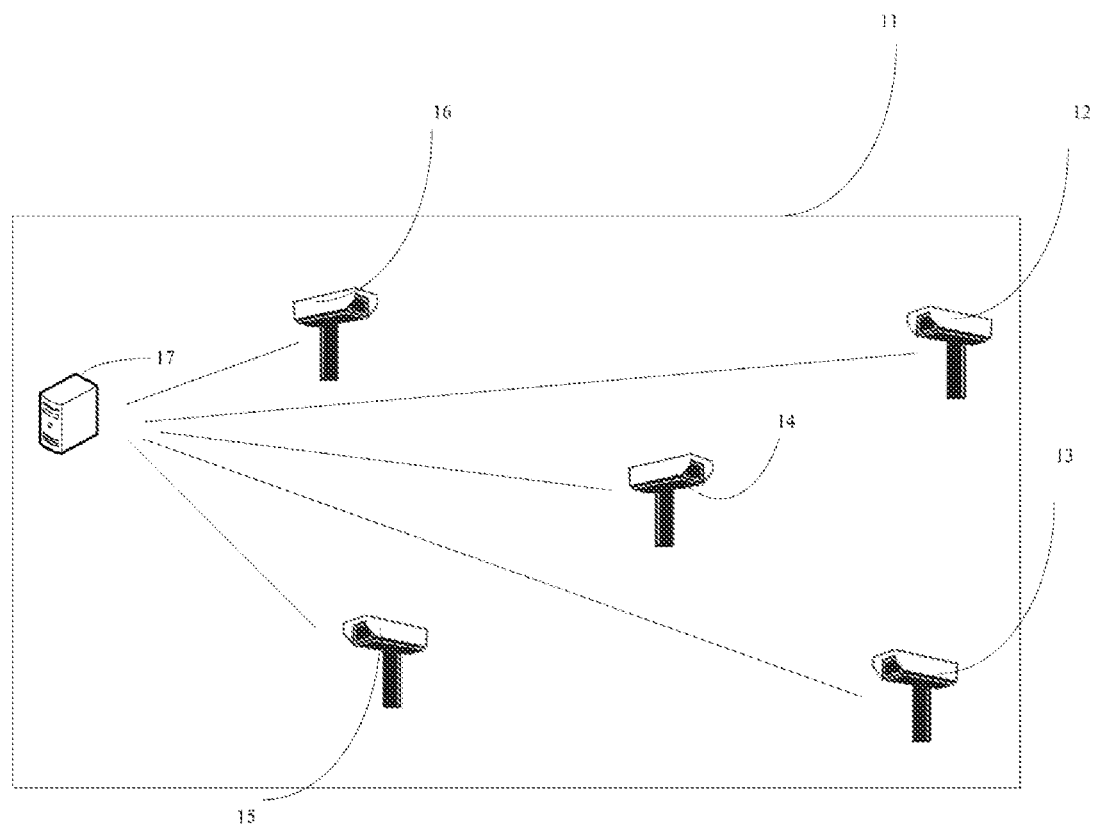
FIG. 1 is a schematic diagram of an application scenario provided by an embodiment of the present disclosure.

The human body tracking method provided by the present disclosure can be applied to the application scenario shown in FIG. 1. As shown in FIG. 1, the application scenario may be specifically an enclosed environment 11 as shown in FIG. 1, and the enclosed environment 11 may be, for example, a supermarket, a shopping mall, or the like. The enclosed environment 11 is provided with a plurality of photographing devices, such as a photographing device 12, a photographing device 13, a photographing device 14, a photographing device 15, and a photographing device 16; it is only a schematic illustration herein, and the number and the position of the photographing devices in the enclosed environment are not limited. Specifically, a plurality of photographing devices can be configured to take photos of different positions in the enclosed environment.

The human body tracking method provided by the present disclosure is intended to solve the above technical problem of the prior art.

The technical solutions of the present disclosure and how the technical solutions of the present application solve the above technical problems will be described in detail below with reference to specific embodiments. The following specific embodiments may be combined with each other, and the same or similar concepts or processes may not be repeated in some embodiments. The embodiments of the present disclosure will be described below with reference to the accompanying drawings.

Figures 2, 3:
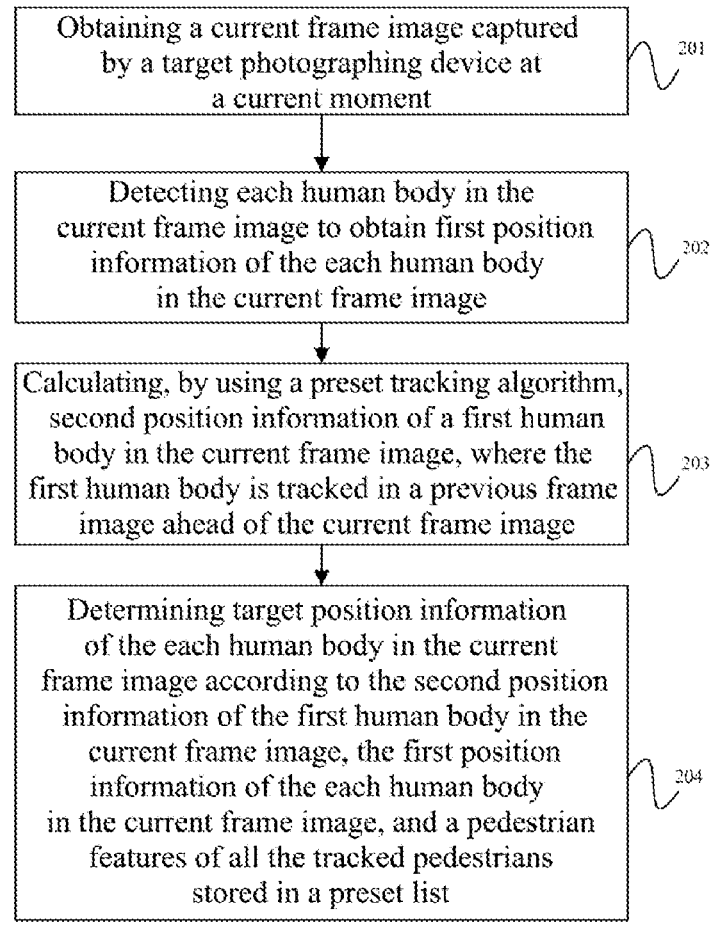
FIG. 2 is a flowchart of a human body tracking method provided by an embodiment of the present disclosure.
FIG. 3 is a schematic diagram of a current frame image provided by an embodiment of the present disclosure.

FIG. 2 is a flowchart of a human body tracking method according to an embodiment of the present disclosure. The embodiment of the present disclosure provides a human body tracking method in view of the above technical problem of the prior art, and the specific steps of the method are as below:

Step 201, obtaining a current frame image captured by a target photographing device at a current moment.

The application scenario also includes a human body tracking apparatus that may be a device independent of a plurality of photographing devices, or may be a component integrated in each photographing device.

If the human body tracking device is independent of the plurality of photographing devices, the human body tracking apparatus may be respectively communicatively connected to each of the plurality of photographing devices, and the communicative connection manner may be a wired connection or a wireless connection. Alternatively, each of the plurality of photographing devices is connected to a human body tracking apparatus, and the human body tracking apparatuses corresponding to the respective photographing devices are communicatively connected to each other.

If the human body tracking apparatus is integrated in a component of each photographing device, each photographing device may include a human body tracking apparatus, and the human body tracking apparatuses included in the respective photographing devices are communicatively connected to each other.

As shown in FIG. 1, a human body tracking apparatus 17 may be a local computer in an enclosed environment 11, or may be a remote server, a cloud server, or the like beyond the closed environment 11. Alternatively, the human body tracking apparatus 17 may specifically be a terminal device having an image processing function. In the present embodiment, the human body tracking apparatus 17 is respectively communicatively connected to each of the plurality of photographing devices. Specifically, the human body tracking apparatus 17 receives the image information captured by each photographing device. For example, the human body tracking apparatus 17 receives a current frame image captured at the current moment by the target photographing device, such as the photographing device 12.

Step 202, detecting each human body in the current frame image to obtain first position information of the each human body in the current frame image.

after receiving the current frame image sent by the photographing device 12, the human body tracking apparatus 17 identifies the human body in the current frame image, that is, detects the each human body in the current frame image to obtain the first position information of the each human body in the current frame image.

As shown in FIG. 3, 30 represents a current frame image captured by the photographing device 12 at the current moment, and the human body tracking apparatus 17 performs detection on the human body in the current frame image 30, for example, a plurality of human bodies, such as a human body A, a human body B, a human body C, a human body D, and a human body E shown in FIG. 3 are detected by using a trained pedestrian detection model; and human body tracking apparatus 17 obtains bounding boxes of all the human bodies in the current frame image 30, for example, multiple dotted boxes as shown in FIG. 3. The above are only for schematic illustration herein, rather than limiting the number and positions of human bodies included in the current frame image 30.

For example, a dotted box 31 is a bounding box of a certain human body in a plurality of human bodies as shown in FIG. 3, and the first position information of the human body in the current frame image 30 can be determined according to the dotted box 31. Specifically, the first position information of the human body in the current frame image 30 includes: a coordinate of the upper left corner (for example, a point 32) of the dotted box 31 in the current frame image 30, and the height and width of the dotted box 31. The first position information of other human bodies in the current frame image 30 is similar thereto, which will not be repeated herein.

Optionally, the human body tracking apparatus 17 may not show the current frame image 30, the human body in the current frame image 30, or the bounding box of the human body. Instead, the human body tracking apparatus 17 may store the first position information of the each human body only after the first position information of the each human body in the current frame image 30 is determined. Alternatively, the human body tracking apparatus 17 may show the current frame image 30, the human body in the current frame image 30, and the bounding box of the human body, and then store the first position information of the each human body after the first position information of the each human body in the current frame image 30 is determined. That is to say, in this embodiment, the first position information of the human body is obtained through the detection of the human body in the current frame image 30 performed by the human body tracking apparatus 17 with the pedestrian detection model.

Step 203, calculating, by using a preset tracking algorithm, second position information of a first human body in the current frame image, where the first human body is tracked in a previous frame image ahead of the current frame image.

Figure 4:
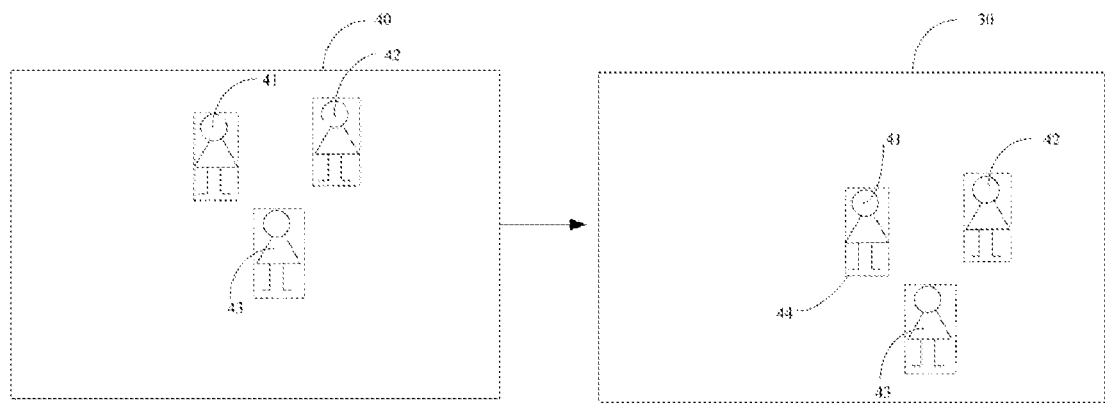
FIG. 4 is a schematic diagram of human body tracking provided by an embodiment of the present disclosure.

As shown in FIG. 4, 40 represents the previous frame image ahead of the current frame image 30, while 41, 42, 43 are the human bodies tracked in the previous frame image by the human body tracking apparatus 17 with the preset tracking algorithm such as the kernelized correlation filters (KCF) tracking algorithm. The human body 41, the human body 42, and the human body 43 are referred to as the first human body herein. Specifically, tracking results of the human bodies in the previous frame 40 obtained by the human body tracking apparatus 17 include the respective position information of the human body 41, the human body 42, and the human body 43 in the previous frame image 40, and include the respective identification information, such as the ID numbers of the human body 41, the human body 42, and the human body 43. The position information of the human body 41, the human body 42, and the human body 43 in the previous frame image 40 may specifically be the coordinates of the upper left corners of the respective human bodies' bounding boxes in the previous frame image 40, and the heights and widths of the bounding boxes.

After obtaining the current frame image 30, the human body tracking apparatus 17 calculates the position information of the first human body in the current frame image 30 according to the current frame image 30 and the tracking result of the human body in the previous frame image 40 obtained by the human body tracking apparatus 17 with the KCF tracking algorithm, where the first human body is tracked in the previous frame image 40 and is for example the human body 41, the human body 42, and the human body 43. The position information of the human body 41, the human body 42, and the human body 43 in the current frame image 30 is referred to as the second position information herein. That is, in this embodiment, the second position information of the human body is the position information of the human body in the current frame image 30, where the human body is tracked in the previous frame image 40 by the human body tracking apparatus 17 with the present tracking algorithm, such as the KCF tracking algorithm.

In the tracking process, the position information and appearance feature of the human body are utilized. As shown in FIG. 4, the positions of the human body 41, the human body 42, and the human body 43 tracked in the current frame image 30 respectively change with respect to the human body 41, the human body 42, and the human body 43 tracked in the previous frame image 40.

Step 204, determining target position information of the each human body in the current frame image according to the second position information of the first human body in the current frame image, the first position information of the each human body in the current frame image, and pedestrian features of all the tracked pedestrians stored in a preset list, where the pedestrian features of all the tracked pedestrians stored in the preset list are determined according to historical images captured by a plurality of photographing devices.

In this embodiment, the human body tracking apparatus 17 can receive the historical images captured by the plurality of photographing devices, determine a pedestrian feature in the historical image according to the historical image captured by each of the photographing devices, and generate the preset list, in which the pedestrian feature and pedestrian identification information, such as an ID number corresponding to the pedestrian feature, are stored, according to the pedestrian feature in the historical image.

As shown in FIG. 3, the human body tracking apparatus 17 detects the human body in the current frame image 30 with the trained pedestrian detection model, and obtains the bounding boxes of all the human bodies in the current frame image 30, thereby obtaining the first position information of all the detected human bodies in the frame image 30. As shown in FIG. 4, the processing device 17 uses the preset tracking algorithm, such as the KCF tracking algorithm, to track the human body in the previous frame image 40 to obtain the second position information of the human body in the current frame image 30. It is assumed that the human body A shown in FIG. 3 and the human body 41 shown in FIG. 4 are the same person, and the human body B shown in FIG. 3 and the human body 42 shown in FIG. 4 are the same person, and the human body C shown in FIG. 3 and the human body 43 shown in FIG. 4 are the same person. It can be understood that the first position information of the human body A in the current frame image 30 may be different from the second position information of the human body 41 in the current frame image 30, the first position information of the human body B in the current frame image 30 may be different from the second position information of the human body 42 in the current frame image 30, and the first position information of the human body C in the current frame image 30 may be different from the second position information of the human body 43 in the current frame image 30. Therefore, it is necessary to determine the target position information of the each human body in the current frame image.

Specifically, the determining target position information of the each human body in the current frame image according to the second position information of the first human body in the current frame image, the first position information of the each human body in the current frame image, and pedestrian features of all the tracked pedestrians stored in a preset list includes: determining target position information of the first human body in the current frame image according to the second position information of the first human body in the current frame image, the first position information of the each human body in the current frame image, and the pedestrian features of all the tracked pedestrians stored in the preset list; determining a second human body corresponding to a piece of first position information which does not match the second position information in the current frame image, according to the second position information of the first human body in the current frame image and the first position information of the each human body in the current frame image; and determining target position information of the second human body in the current frame image according to the piece of first position information of the second human body in the current frame image and the pedestrian features of all the tracked pedestrians stored in the preset list.

For example, the target position information of the human body 41, the human body 42, and the human body 43 in the current frame image 30 is determined according to the second position information of the human body 41, the human body 42, and the human body 43 in the current frame image 30, the first position information of the each human body in the current frame image 30, and pedestrian features of all the tracked pedestrians stored in the preset list, where the target position information is the more accurate one of the first position information and the second position information.

In addition, the second position information of each of the human body 41, the human body 42, and the human body 43 in the current frame image 30 is compared with the first position information of the each human body in the current frame image 30, and then the first position information that matches the second position information of the human body 41, the human body 42, or the human body 43 in the current frame image 30 is determined from the first position information of the each human body in the current frame image 30. For example, through comparison, it is determined that the first position information of the human body A in the current frame image 30 matches the second position information of the human body 41 in the current frame image 30, the first position information of the human body B in the current frame image 30 matches the second position information of the human body 42 in the current frame image 30, the first position information of the human body C in the current frame image 30 matches the second position information of the human body 43 in the current frame image 30. That is, the human body A matches the human body 41, the human body B matches the human body 42, and the human body C matches the human body 43. It can be seen that the human body D does not match the human body 41, the human body 42, or the human body 43, and the human body E does not match the human body 41, the human body 42, or the human body 43. Since the current frame image 30 is captured by the photographing device 12 at the current moment, the human body D and the human body E may be human bodies newly entering the coverage of the photographing device 12 at the current moment. The tracked human body that does not match the human body such as the human body 41, the human body 42, and the human body 43, is referred to as the second human body herein; the target position information of the human body D and the human body E in the current frame image 30 is determined further according to the first position information of the human body D and the human body E in the current frame image 30 and the pedestrian features of all the tracked pedestrians stored in the preset list.

Specifically, the determining target position information of the each human body in the current frame image according to the second position information of the first human body in the current frame image, the first position information of the each human body in the current frame image, and pedestrian features of all the tracked pedestrians stored in a preset list includes: comparing the second position information of the first human body in the current frame image with the first position information of the each human body in the current frame image; extracting, an image feature of a first region corresponding to the second position information in the current frame image if the first position information of the each human body in the current frame image does not match the second position information; comparing the image feature of the first region corresponding to the second position information in the current frame image with the pedestrian features of all the tracked pedestrians stored in the preset list; and taking the second position information as the target position information of the first human body in the current frame image if a pedestrian feature that matches an image feature of the first region exists in the preset list. For example, in a case where the human body tracking apparatus 17 attempts to match the second position information of the human body 41 in the current frame image 30 respectively with the first position information of the human body A, the human body B, the human body C, the human body D, and the human body E in the current frame image 30, and none of the first position information of the human body A, the human body B, the human body C, the human body D, and the human body E matches the second position information of the human body 41 in the current frame image 30, the image feature of the region corresponding to the human body 41 in the current frame image 30 is extracted, where the region corresponding to human body 41, the human body 42, and the human body 43 in the current frame image 30 is referred to as the first region herein. As shown in FIG. 4, the dotted box 44 is a region corresponding to the human body 41 in the current frame image 30. The position information of the dotted box 44 is the second position information of the human body 41 in the current frame image 30. Further, the human body tracking apparatus 17 compares the image feature in the dotted box 44 with the pedestrian features of all the tracked pedestrians stored in the preset list. Specifically, the preset list stores the pedestrian features of all the tracked pedestrians and the pedestrian IDs corresponding to the pedestrian features. Optionally, the pedestrian features of all the tracked pedestrians stored in the preset list may be determined by the human body tracking apparatus 17 according to the images captured by the plurality of photographing devices shown in FIG. 1 at different historical moments. The plurality of photographing devices may include a target photographing device such as the photographing device 12, or may not include any target photographing device such as the photographing device 12. It can be understood that the pedestrian features of all the tracked pedestrians stored in the preset list may be features of all pedestrians in the enclosed environment 11 shown in FIG. 1. Specifically, if a pedestrian feature that matches the image feature in the dotted box 44 exists in the preset list, the second position information of the human body 41 in the current frame image 30 is taken as the target position information of the human body 41 in the current frame image 30. If no pedestrian feature that matches the image feature in the dotted box 44 exists in the preset list, the second position information of the human body 41 in the current frame image 30 is discarded, that is, the second position information of the human body 41 in the current frame image 30 is inaccurate.

Similarly, In the case where the human body tracking apparatus 17 attempts to match the second position information of the human body 42 (or the human body 43) in the current frame image 30 respectively with the first position information of the human body A, the human body B, the human body C, the human body D, and the human body E in the current frame image 30, and the first position information of the human body A, the human body B, the human body C, the human body D, and the human body E does not match the second position information of the human body 42 (or the human body 43) in the current frame image 30, then the human body tracking apparatus 17 can determine the target position information of the human body 42 (or the human body 43) in the current frame image 30 by further comparing with the pedestrian features stored in the preset list.

In addition, if a piece of first position information that matches the second position information exists in the first position information of the each human body in the current frame image, the second position information is taken as the target position information of the first human body in the current frame image.

Specifically, in a case where the human body tracking apparatus 17 attempts to match the second position information of the human body 41 in the current frame image 30 respectively with the first position information of the human body A, the human body B, the human body C, the human body D, and the human body E in the current frame image 30, and if the first position information of one human body among the human body A, the human body B, the human body C, the human body D, and the human body E, such as the human body A, matches the second position information of the human body 41 in the current frame image 30, the second position information of the human body 41 in the current frame image 30 is taken as the target position information of the human body 41 in the current frame image 30. Similarly, if the first position information of the human body B matches the second position information of the human body 42 in the current frame image 30, the second position information of the human body 42 in the current frame image 30 is taken as the target position information of the human body 42 in the current frame image 30; if the first position information of the human body C matches the second position information of the human body 43 in the current frame image 30, the second position information of the human body 43 in the current frame image 30 is taken as the target position information of the human body 43 in the current frame image 30.

The embodiment of the present disclosure obtains first position information of each human body in a current frame image by detecting the each human body in the current frame image, calculates second position information of a first human body in the current frame image tracked in a previous frame image ahead of the current frame image by using a preset tracking algorithm, determines target position information of the each human body in the current frame image according to the second position information, the first position information of the each human body in the current frame image, and pedestrian features of all the tracked pedestrians stored in a preset list; where the pedestrian features of all the tracked pedestrians stored in the preset list are determined according to historical images captured by a plurality of photographing devices, and the target position information is the more accurate one of the first position information and the second position information, thereby improving the accuracy of human body tracking in images. The above embodiment is merely intended for illustration, and the quantity of human body in the current frame image may also be at least one.

Figure 5:
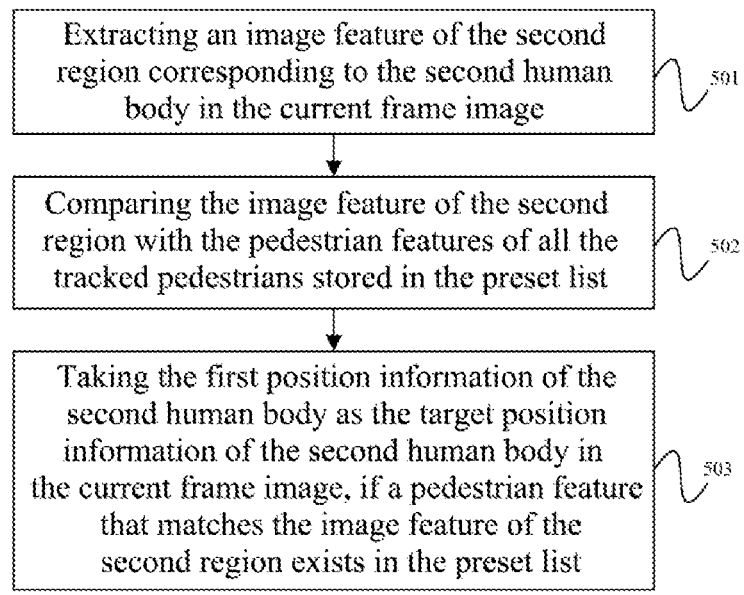
FIG. 5 is a flowchart of a human body tracking method provided by another embodiment of the present disclosure.

FIG. 5 is a flowchart of a human body tracking method according to another embodiment of the present disclosure. On the basis of the above embodiments, the determining, the target position information of the second human body in the current frame image according to the first position information of the second human body in the current frame image and pedestrian features of all the tracked pedestrians stored in the preset list, may specifically include following steps:

Step 501, extracting an image feature of a second region corresponding to the second human body in the current frame image.

As shown in FIG. 3, the dotted box 31 is the region occupied by the human body E in the current frame image 30, and the dotted box 33 is the region occupied by the human body D in the current frame image 30. The regions occupied by the human body E and the human body D in the current frame image 30 are referred to as a second region herein. Specifically, the human body tracking apparatus 17 extracts image features within both the dotted box 31 and the dotted box 33.

Step 502, comparing the image feature of the second region with the pedestrian features of all the tracked pedestrians stored in the preset list.

Optionally, the human body tracking apparatus 17 compares the image feature within the dotted box 31 with the pedestrian features of all the tracked pedestrians stored in the preset list, and compares the image feature within the dotted box 33 with the pedestrian features of all the tracked pedestrians stored in the preset list.

Step 503, taking the piece of first position information of the second human body as the target position information of the second human body in the current frame image if a pedestrian feature that matches the image feature of the second region exists in the preset list.

If the pedestrian feature that matches the image feature in the dotted box 31 exists in the preset list, the first position information of the human body E in the current frame image 30 is taken as the target position information of the human body E in the current frame image 30. If no pedestrian feature that matches the image feature in the dotted box 31 exists in the preset list, the first position information of the human body E in the current frame image 30 is discarded, that is, the first position information of the human body E in the current frame image 30 is considered inaccurate.

Similarly, if the pedestrian feature that matches the image feature in the dotted frame 33 exists in the preset list, the first position information of the human body D in the current frame image 30 is taken as the target position information of the human body D in the current frame image 30. If no pedestrian feature that matches the image feature in the dotted box 33 exists in the preset list, the first position information of the human body D in the current frame image 30 is discarded, that is, the first position information of the human body D in the current frame image 30 is considered inaccurate.

In addition, taking the human body A among the human body A, the human body B, and the human body C shown in FIG. 3 as an example, if the first position information of the human body A does not match the second position information of any one human body among the human body 41, the human body 42, and the human body 43 in the current frame image 30 shown in FIG. 4, the target position information of the human body A in the current frame image 30 can also be determined by a method similar to that for determining the target position information of the human body D and the human body E, and the specific process will not be repeated herein.

In addition, on the basis of this embodiment, the method further includes: updating a tracker parameter corresponding to a preset tracking algorithm according to the target position information of the first human body in the current frame image and the target position information of the second human body in the current frame image.

Figure 6:
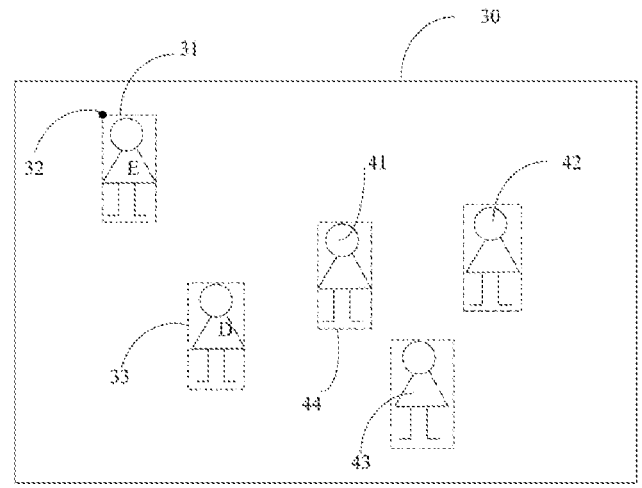
FIG. 6 is a schematic diagram of a current frame image provided by an embodiment of the present disclosure.

It is assumed that the second position information of the human body 41, the human body 42, and the human body 43 in the current frame image 30 is the corresponding target position information, and the first position information of the human body D and the human body E in the current frame image 30 is the corresponding target position information, then the final position of the each human body in the current frame image 30 shown in FIG. 6 can be determined.

In this embodiment, one pedestrian may correspond to one tracker. When the human body tracking apparatus 17 determines the final position of the each human body in the current frame image 30, the tracker parameter corresponding to the each human body can be updated according to the final position of the each human body in the current frame image 30. It can be understood that the tracker is associated with a preset tracking algorithm such as the KCF tracking algorithm.

In addition, on the basis of this embodiment, the method further includes: updating the pedestrian features of the tracked pedestrians in the preset list according to the target position information of the first human body in the current frame image and the target position information of the second human body in the current frame image.

It can be understood that the preset list includes, but is not limited to, the pedestrian features of the human body 41, the human body 42, the human body 43, the human body D, and the human body E. When the human body tracking apparatus 17 determines the final position of the each human body in the current frame image 30, the pedestrian features respectively corresponding to the human body 41, the human body 42, the human body 43, the human body D, and the human body E in the preset list may be updated according to the final positions of the human body 41, the human body 42, the human body 43, the human body D, and the human body E in the current frame image 30.

The embodiments of the present disclosure update the tracker parameter corresponding to the preset tracking algorithm continuously, so that the tracker corresponding to the preset tracking algorithm can continuously adapt to the change of the tracking target position and appearance, thus improving the accuracy of the human body tracking in the image; in addition, it can be ensured that the latest pedestrian features are stored in the preset list by continuously updating the pedestrian features of the tracked pedestrians in the preset list, which further improves the accuracy of human body tracking in the image.

Figure 7:
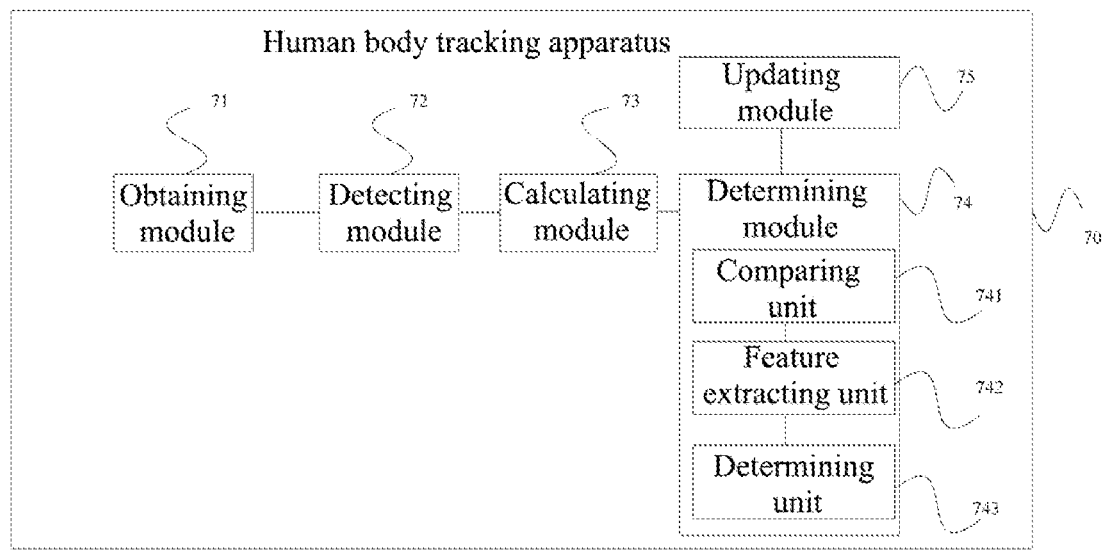
FIG. 7 is a schematic structural diagram of a human body tracking apparatus provided by an embodiment of the present disclosure.

FIG. 7 is a schematic structural diagram of a human body tracking apparatus according to an embodiment of the present disclosure. The human body tracking apparatus provided by the embodiments of the present disclosure can perform the processing flow provided by the embodiments of the human body tracking method. As shown in FIG. 7, a human body tracking apparatus 70 includes: an obtaining module 71, a detecting module 72, a calculating module 73, and a determining module 74; where the obtaining module 71 is configured to obtain a current frame image captured by a target photographing device at a current moment; the detecting module 72 is configured to detect each human body in the current frame image to obtain first position information of the each human body in the current frame image; the calculating module 73 is configured to calculate, by using a preset tracking algorithm, second position information of a first human body in the current frame image, wherein the first human body is tracked in a previous frame image ahead of the current frame image; the determining module 74 is configured to determine target position information of the each human body in the current frame image according to the second position information of the first human body in the current frame image, the first position information of the each human body in the current frame image, and the pedestrian features of all tracked pedestrians stored in a preset list; where the pedestrian features of all the tracked pedestrians stored in the preset list are determined according to historical images captured by a plurality of photographing devices.

Optionally, the determining module 74 is specifically configured to:

determine target position information of the first human body in the current frame image according to the second position information of the first human body in the current frame image, the first position information of the each human body in the current frame image, and the pedestrian features of all the tracked pedestrians stored in the preset list;

determine a second human body corresponding to a piece of first position information which does not match the second position information in the current frame image, according to the second position information of the first human body in the current frame image and the first position information of the each human body in the current frame image; and determine target position information of the second human body in the current frame image according to the piece of first position information of the second human body in the current frame image and the pedestrian features of all the tracked pedestrians stored in the preset list.

Optionally, the determining module 74 includes: a comparing unit 741, a feature extracting unit 742, and a determining unit 743. The comparing unit 741 is configured to compare the second position information of the first human body in the current frame image with the first position information of the each human body in the current frame image; the feature extracting unit 742 is configured to extract an image feature of a first region corresponding to the second position information in the current frame image if the first position information of the each human body in the current frame image does not match the second position information; the comparing unit 741 is further configured to compare the image feature of the first region corresponding to the second position information in the current frame image with the pedestrian features of all the tracked pedestrians stored in the preset list; the determining unit 743 is configured to take the second position information as the target position information of the first human body in the current frame image if a pedestrian feature that matches an image feature of the first region exists in the preset list.

Optionally, the determining unit 743 is further configured to take the second position information as the target position information of the first human body in the current frame image if a piece of first position information that matches the second position information exists in the first position information of the each human body in the current frame image.

Optionally, the feature extracting unit 742 is configured to extract an image feature of a second region corresponding to the second human body in the current frame image; and comparing unit 741 is configured to compare the image feature of the second region with the pedestrian features of all the tracked pedestrians stored in the preset list; the determining unit 743 is configured to take the piece of first position information of the second human body as the target position information of the second human body in the current frame image if a pedestrian feature that matches the image feature of the second region exists in the preset list.

Optionally, the human body tracking apparatus 70 further includes: an updating module 75, configured to update a tracker parameter corresponding to a preset tracking algorithm according to the target position information of the first human body in the current frame image and the target position information of the second human body in the current frame image.

Optionally, the updating module 75 is configured to update the pedestrian features of the tracked pedestrians in the preset list according to the target position information of the first human body in the current frame image and the target position information of the second human body in the current frame image.

The human body tracking apparatus of the embodiment shown in FIG. 7 can be used to implement the technical solution of the above method embodiments. As the implementation principle and technical effects of the human body tracking apparatus and the method embodiments are similar, details will not be repeated herein.

Figure 8:
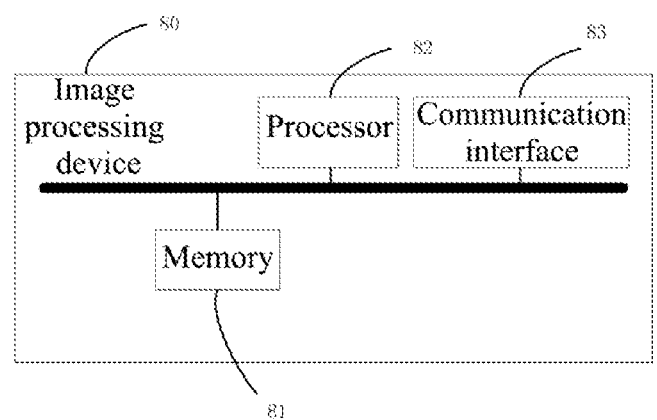
FIG. 8 is a schematic structural diagram of an image processing device according to an embodiment of the present disclosure.

FIG. 8 is a schematic structural diagram of an image processing device according to an embodiment of the present disclosure. The image processing device provided by the embodiments of the present disclosure may perform the processing flow provided by the embodiment of the human body tracking method. As shown in FIG. 8, an image processing device 80 includes a memory 81, a processor 82, a computer program, and a communication interface 83; where the computer program is stored in the memory 81 and is configured to be executed by the processor 82 to perform the human body tracking method described in the above embodiments.

The image processing device of the embodiment shown in FIG. 8 can be configured to perform the technical solution of the above method embodiments. The implementation principle and the technical effect of the image processing device and the method embodiments are similar, details will not be repeated herein.

In addition, this embodiment further provides a computer readable storage medium having a computer program stored thereon, and the computer program is executed by the processor to implement the human body tracking method described in the above embodiments.

In the several embodiments provided by the present application, it should be understood that the disclosed apparatus and method may be implemented in other manners. For example, the apparatus embodiments described above are merely illustrative. For example, the division of the unit is only a logical function division, and there may be another division manner in actual implementation; for example, multiple units or components may be combined or may be integrated into another system, or some features can be ignored or not be executed. In addition, the mutual coupling, direct coupling or communication connection shown or discussed may be an indirect coupling or communication connection through some interfaces, apparatuses or units, and may be in an electrical, mechanical or other form.

The unit described as a separate component may or may not be physically separated, and the components displayed as units may or may not be a physical unit, that is, the components may be located in one place, or may be distributed to multiple network units. Some or all the units may be selected as actually required, to achieve the purpose of the solution of the embodiment.

In addition, each functional unit in each embodiment of the present disclosure may be integrated into one processing unit, or each unit may exist physically and separately, or two or more units may be integrated into one unit. The above integrated unit can be implemented in the form of hardware or in the form of hardware and software functional unit.

The integrated unit described above implemented in the form of a software functional unit can be stored in a computer readable storage medium. The above software functional unit is stored in a storage medium and includes instructions for causing a computer device (which may be a personal computer, a server, a network device, or the like) or a processor to perform part of the steps of the methods according to the various embodiments of the present disclosure. The above storage medium includes medium that stores program codes like a flash memory, a mobile hard disk, a read-only memory (ROM), a random access memory (RAM), a magnetic disk, or an optical disk.

Those skilled in the art can clearly understand that only the division of each functional module described above is exemplified for the convenience and brevity of description. In practical applications, the above functions can be assigned to different functional modules as required, that is, the internal structure of the apparatus can be divided into different functional modules to perform all or part of the functions described above. Reference can be made to corresponding processes in the above method embodiments for the specific working processes of the apparatus described above, which will not be repeated herein.

Finally, it should be noted that the above embodiments are merely illustrative of the technical solutions of the present disclosure, and are not to be taken in a limiting sense; although the present disclosure has been described in detail with reference to the above embodiments, those skilled in the art will understand that they may still modify the technical solutions described in the above embodiments, or equivalently substitute some or all of the technical features; and the modifications or substitutions do not make the nature of the corresponding technical solutions deviate from the scope of the technical solutions of each embodiment of the present disclosure.

What is claimed is:

1. A human body tracking method, comprising:
obtaining a current frame image captured by a target photographing device at a current moment;
detecting each human body in the current frame image to obtain first position information of the each human body in the current frame image;
calculating, by using a kernelized correlation filters (KCF) tracking algorithm, second position information of a first human body in the current frame image, wherein the first human body is at least one human body tracked using the KCF tracking algorithm in a previous frame image ahead of the current frame image;
determining target position information of the each human body in the current frame image using the second position information of the first human body in the current frame image, the first position information of the each human body in the current frame image, and pedestrian features of all tracked pedestrians stored in a preset list; wherein the target position information is the more accurate one of the first position information and the second position information;
wherein the pedestrian features of all the tracked pedestrians stored in the preset list are image features in historical images captured by at least one photographing device at different historical moments.

2. The method according to claim 1, wherein the determining target position information of the each human body in the current frame image using the second position information of the first human body in the current frame image, the first position information of the each human body in the current frame image, and pedestrian features of all tracked pedestrians stored in a preset list comprises:
determining target position information of the first human body in the current frame image using the second position information of the first human body in the current frame image, the first position information of the each human body in the current frame image, and the pedestrian features of all the tracked pedestrians stored in the preset list;

determining a second human body corresponding to a piece of first position information which does not match the second position information in the current frame image, according to the second position information of the first human body in the current frame image and the first position information of the each human body in the current frame image; and determining target position information of the second human body in the current frame image using the piece of first position information of the second human body in the current frame image and the pedestrian features of all the tracked pedestrians stored in the preset list.

3. The method according to claim 2, wherein the determining target position information of the first human body in the current frame image using the second position information of the first human body in the current frame image, the first position information of the each human body in the current frame image, and the pedestrian features of all the tracked pedestrians stored in the preset list comprises:

comparing the second position information of the first human body in the current frame image with the first position information of the each human body in the current frame image;

extracting an image feature of a first region corresponding to the second position information in the current frame image if the first position information of the each human body in the current frame image does not match the second position information;

comparing the image feature of the first region corresponding to the second position information in the current frame image with the pedestrian features of all the tracked pedestrians stored in the preset list; and taking the second position information as the target position information of the first human body in the current frame image if a pedestrian feature that matches the image feature of the first region exists in the preset list.

4. The method according to claim 3, wherein the determining target position information of the first human body in the current frame image using the second position information of the first human body in the current frame, the first position information of the each human body in the current frame image, and the pedestrian features of all the tracked pedestrians stored in the preset list further comprises:

in response to comparing the second position information of the first human body in the current frame image with the first position information of the each human body in the current frame image, taking the second position information as the target position information of the first human body in the current frame image if a piece of first position information that matches the second position information exists in the first position information of the each human body in the current frame image.

5. The method according to claim 2, wherein the determining of target position information of the second human body in the current frame image according to the piece of first position information of the second human body in the current frame image and the pedestrian features of all the tracked pedestrians stored in the preset list comprises:

extracting an image feature of a second region corresponding to the second human body in the current frame image;

comparing the image feature of the second region with the pedestrian features of all the tracked pedestrians stored in the preset list; and taking the piece of first position information of the second human body as the target position information of the second human body in the current frame image if a pedestrian feature that matches the image feature of the second region exists in the preset list.

6. The method according to claim 2, wherein the method further comprises:

updating a tracker parameter corresponding to a preset tracking algorithm according to the target position information of the first human body in the current frame image and the target position information of the second human body in the current frame image.

7. The method according to claim 2, wherein the method further comprises:

updating the pedestrian features of the tracked pedestrians in the preset list according to the target position information of the first human body in the current frame image and the target position information of the second human body in the current frame image.

8. An image processing device, comprising:
a memory;
a processor; and
a computer program;
wherein the computer program is stored in the memory and configured to be executed by the processor to implement the method according to claim 1.

9. The method of claim 1, wherein it is performed by a non-transitory computer readable storage medium, wherein a computer program is stored thereon, and the computer program is executed by a processor.

10. A human body tracking apparatus, comprising: a processor and a computer-readable medium for storing program codes, which, when executed by the processor, cause the processor to: obtain a current frame image captured by a target photographing device at a current moment;

detect each human body in the current frame image to obtain first position information of the each human body in the current frame image;

calculate, by using a kernelized correlation filters (KCF), tracking algorithm, second position information of a first human body in the current frame image, wherein the first human body is at least one human body tracked using the KCF tracking algorithm in a previous frame image ahead of the current frame image; and determine target position information of the each human body in the current frame image using the second position information of the first human body in the current frame image, the first position information of the each human body in the current frame image, and pedestrian features of all tracked pedestrians stored in a preset list; wherein the target position information is the more accurate one of the first position information and the second position information;

wherein the pedestrian features of all the tracked pedestrians stored in the preset list are image features in historical images captured by at least one photographing device at different historical moments.

11. The human body tracking apparatus according to claim 10, wherein the program codes further cause the processor to:

determine target position information of the first human body in the current frame image using the second position information of the first human body in the current frame image, the first position information of the each human body in the current frame image, and the pedestrian features of all the tracked pedestrians stored in the preset list;

determine a second human body corresponding to a piece of first position information which does not match the second position information in the current frame image, according to the second position information of the first human body in the current frame image and the first position information of the each human body in the current frame image; and determine target position information of the second human body in the current frame image using the piece of first position information of the second human body in the current frame image and the pedestrian features of all the tracked pedestrians stored in the preset list.

12. The human body tracking apparatus according to claim 11, wherein the program codes further cause the processor to: compare the second position information of the first human body in the current frame image with the first position information of the each human body in the current frame image;

extract an image feature of a first region corresponding to the second position information in the current frame image if the first position information of the each human body in the current frame image does not match the second position information;

compare the image feature of the first region corresponding to the second position information in the current frame image with the pedestrian features of all the tracked pedestrians stored in the preset list; and take the second position information as the target position information of the first human body in the current frame image if a pedestrian feature that matches the image feature of the first region exists in the preset list.

13. The human body tracking apparatus according to claim 12, wherein the program codes further cause the processor to take the second position information as the target position information of the first human body in the current frame image if a piece of first position information that matches the second position information exists in the first position information of the each human body in the current frame image.

14. The human body tracking apparatus according to claim 11, wherein the program codes further cause the processor to: extract an image feature of a second region corresponding to the second human body in the current frame image;

compare the image feature of the second region with the pedestrian features of all the tracked pedestrians stored in the preset list; and take the piece of first position information of the second human body as the target position information of the second human body in the current frame image if a pedestrian feature that matches the image feature of the second region exists in the preset list.

15. The human body tracking apparatus according to claim 11, wherein the program codes further cause the processor to update a tracker parameter corresponding to a preset tracking algorithm according to the target position information of the first human body in the current frame image and the target position information of the second human body in the current frame image.

16. The human body tracking apparatus according to claim 11, wherein the program codes further cause the processor to update the pedestrian features of the tracked pedestrians in the preset list according to the target position information of the first human body in the current frame image and the target position information of the second human body in the current frame image.

* * * * *